United States Patent [19]

Halter

[11] Patent Number: 5,251,464
[45] Date of Patent: Oct. 12, 1993

[54] BICYCLE LOCK WITH STORABLE REEL CABLE

[76] Inventor: Robert Halter, 15469 Chemical La., Huntington Beach, Calif. 92649

[21] Appl. No.: 940,069

[22] Filed: Sep. 3, 1992

[51] Int. Cl.$^5$ .......................................... E05B 71/00
[52] U.S. Cl. .......................................... 70/30; 70/233; 70/261; 224/39; 242/107; 280/288.4
[58] Field of Search .................. 70/18, 30, 49, 233, 70/234, 258, 261; 224/39, 275; 242/107, 107.6; 280/288.4

[56] References Cited

U.S. PATENT DOCUMENTS

| | | | |
|---|---|---|---|
| 3,906,758 | 9/1975 | Hurwitt | 70/30 |
| 3,969,914 | 7/1976 | Dennen | 70/18 X |
| 3,990,279 | 11/1976 | Brickel | 70/233 |
| 4,064,715 | 12/1977 | Hodgson et al. | 70/18 |
| 4,086,795 | 5/1978 | Foster et al. | 70/233 |
| 4,126,024 | 11/1978 | Timmons et al. | 70/233 |
| 4,404,822 | 9/1983 | Green | 70/233 |
| 4,571,965 | 2/1986 | LeRoux | 70/227 |
| 4,691,539 | 9/1987 | Gover | 70/18 |
| 4,807,453 | 2/1989 | Bernier et al. | 70/233 |
| 4,896,517 | 1/1990 | Ling | 70/18 |
| 4,966,382 | 10/1990 | Giles | 280/288.4 |
| 4,970,882 | 11/1990 | Arrendondo | 70/233 X |
| 5,156,031 | 10/1992 | Gaul | 280/288.4 X |

FOREIGN PATENT DOCUMENTS 1029412 4/1978 Canada .......................... 280/288.4

OTHER PUBLICATIONS

Catalog page, "Retracta-cable bike lock", #N-163188.

Primary Examiner—Lloyd A. Gall
Attorney, Agent, or Firm—Macro-Search Corp.

[57] ABSTRACT

An apparatus is provided for a bicycle lock assembly. A housing has an annular outer wall with a cable access slot and an integral rear wall. The rear wall supports a tubular inner wall that extends from the rear wall coaxially with the outer wall to define a torus shaped interior space. A reel provides a tubular core that is rotatably mounted onto the inner wall. The core supports a pair of spaced-apart guide walls which define a coiling space therebetween. A flexible cable is wound onto the reel between the guide walls. One end of the cable is fixed to the core. The other end of the cable extends through the access slot and includes a first lock mechanism. A coil spring has one end fixed to the annular outer wall and the other end fixed to the core of the reel. The spring lays in a spiral form adjacent to one of the guide walls such that rotation of the reel to unreel the cable causes the coil spring to tighten. Similarly, rotation of the reel to reel-in the cable causes the coil spring to loosen. A housing cover is fixed to the open side of the housing to enclose the housing. The cover has a central hole aligned with the inside diameter of the core so that the housing may be placed onto a tubular member of a bicycle. The housing is then retained on the tubular member of the bicycle by a bicycle seat. The housing has a second lock mechanism, and the two lock mechanisms are engagably lockable such that the housing, and therefore the bicycle, may be secured to a fixed object.

4 Claims, 1 Drawing Sheet

BICYCLE LOCK WITH STORABLE REEL CABLE

FIELD OF THE INVENTION

This invention relates generally to bicycle locks, and, more particularly, to a lock assembly that is attached to a tubular support member of a bicycle seat.

BACKGROUND OF THE INVENTION

It is well known that a bicycle lock that is attached to the bicycle is more convenient to use than a conventional bicycle lock and cable arrangement. Several prior art devices employ a spring-loaded reel mounted to the bicycle and upon which a coiled lock cable is wound. The user of such a device simply unwinds the cable by pulling one end of the cable around a fixed object and locking the one end to a mating lock mechanism, typically fixed to the reel. The following U.S. Patents are examples of such devices:

| U.S. Pat. No. | ISSUE DATE | INVENTOR |
| --- | --- | --- |
| 4,404,822 | 9/20/83 | Green |
| 4,126,024 | 11/21/78 | Timmons et al. |
| 4,086,795 | 5/2/78 | Foster et al. |
| 3,990,279 | 11/9/76 | Brickel |

Such prior art devices typically have complicated means by which they attach to the bicycle, typically at a tubular member thereof. Such complicated attachment means tend to increase the manufacturing cost of such devices, and also tend to be more difficult to install. Further, such devices tend to be fairly large and, therefore, obtrusive if mounted within the bicycle frame where water bottles, tire air pumps, and the like, are also typically mounted. Still further, many such prior art devices are mounted fairly low, requiring the user of such devices to bend over in order to use the device, such as when reading numbers on a combination lock, for example. Some people have difficulty using such devices as a result.

Consequently, there is a need for a bicycle locking device that is extremely easy and inexpensive to manufacture. Such a needed device would also be easy to install and use, and would not be obtrusive to the use of the bicycle or other accessory items therefore. Further, such a needed device would be effective in locking a bicycle to a fixed object quickly and securely. The present invention fulfills these needs and provides further related advantages.

SUMMARY OF THE INVENTION

The present invention is a bicycle lock assembly. A housing has an annular outer wall with a cable access slot and an integral rear wall. The rear wall supports a tubular inner wall that extends from the rear wall coaxially with the outer wall to define a torus shaped interior space. A reel provides a tubular core that is rotatably mounted onto the inner wall. The core supports a pair of spaced-apart guide walls which define a coiling space therebetween. A flexible cable is wound onto the reel between the guide walls. One end of the cable is fixed to the core. The other end of the cable extends through the access slot and includes a first lock mechanism. A coil spring has one end fixed to the annular outer wall and the other end fixed to the core of the reel. The spring lays in a spiral form adjacent to one of the guide walls such that rotation of the reel to unreel the cable causes the coil spring to tighten. Similarly, rotation of the reel to reel-in the cable causes the coil spring to loosen. A housing cover is fixed to the open side of the housing to enclose the housing. The cover has a central hole aligned with the inside diameter of the core so that the housing may be placed onto a tubular member of a bicycle. The housing is then retained on the tubular member of the bicycle by a bicycle seat. The housing has a second lock mechanism, and the two lock mechanisms are engagably lockable such that the housing, and therefore the bicycle, may be secured to a fixed object.

The present invention is a bicycle locking device that is extremely easy and inexpensive to manufacture. Further, the present invention is also easy to install and use, and is not obtrusive to the rider of the bicycle when riding or when using other accessory items such as water bottles, air pumps, and the like. Further, the present device effectively locks the bicycle to a fixed object, such as a parking meter or traffic sign, quickly and securely. Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
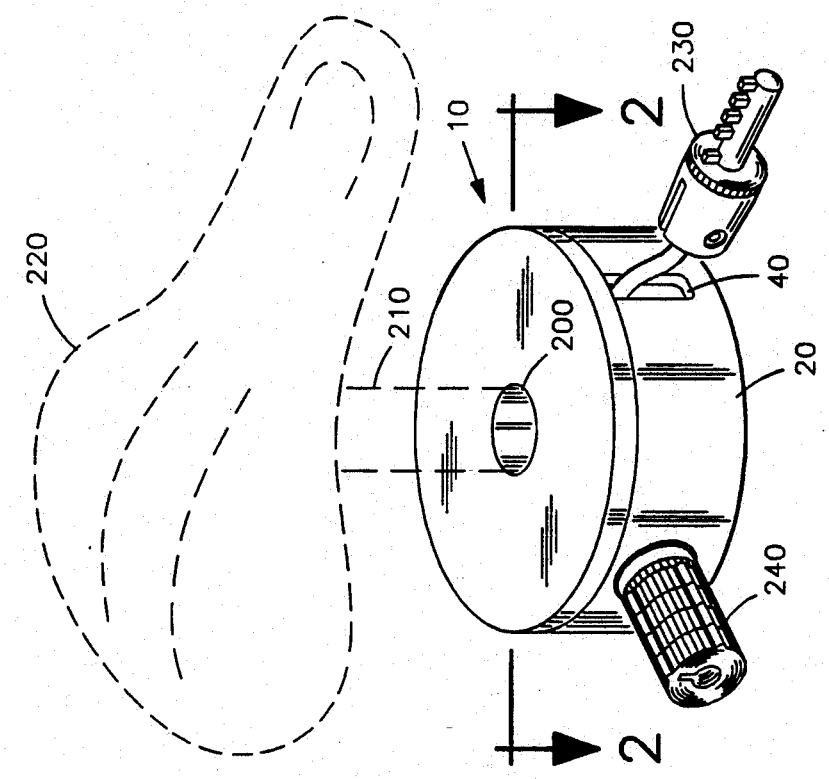
FIG. 1 is a perspective illustration of the invention, illustrating a housing supported on a tubular member of a bicycle in phantom outline.

FIG. 1 shows a bicycle lock assembly 10. A housing 20 has an annular outer wall 30 with a cable access slot 40 and an integral rear wall 50. The rear wall 50 and the annular outer wall 30 define a drum-like compartment. The rear wall 50 supports a tubular inner wall 70 that extends from the rear wall 50 coaxially with the outer wall 30 to define a torus shaped interior space. Preferably, the housing 20 is manufactured from a strong, tamper-resistant material, such as steel or other metal alloy.

Figure 3:
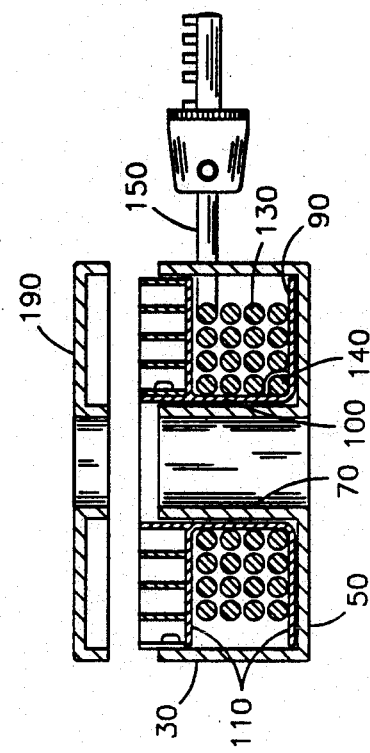
FIG. 3 is a cross sectional view of the invention, taken generally along lines 3—3 of FIG. 2, illustrating a flexible cable wound on the reel of the invention.

A reel 90 provides a tubular core 100 that is rotatably mounted onto the inner wall 70. The core 100 supports a pair of spaced-apart guide walls 110 (FIG. 3) which define a coiling space therebetween. A flexible cable 130 is wound onto the reel 90 between the guide walls 110. One end 140 of the cable 130 is fixed to the core 100. The other end 150 of the cable 130 extends through the access slot 40.

Figure 2:
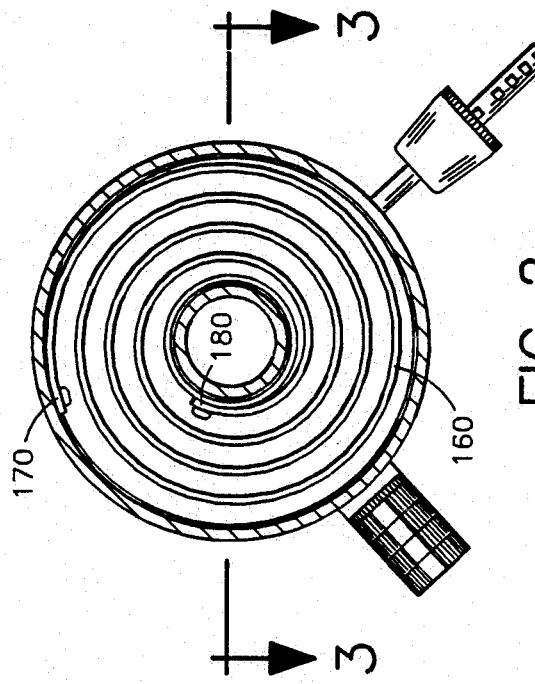
FIG. 2 is a cross sectional view of the invention, taken generally along lines 2—2 of FIG. 1, illustrating a coil spring on a reel of the invention.

A coil spring 160 has one end 170 fixed to the annular outer wall 30 and the other end 180 fixed to the core 100 of the reel 90. The spring 160 lays in a spiral form (FIG. 2) adjacent to one of the guide walls such that rotation of the reel 90 to unreel the cable 130 causes the coil spring 160 to tighten. Similarly, rotation of the reel 90 to reel-in the cable 130 causes the coil spring 160 to loosen.

A housing cover 190 is fixed to the open side of the housing 20 to enclose the housing 20. The cover 190 has a central hole 200 aligned with the inside diameter of the core 100 so that the housing may be placed onto a tubular member 210 of a bicycle (FIG. 1). The housing 20 is then retained on the tubular member 210 of the bicycle by a bicycle seat 220.

The cable 130 has a first lock mechanism 230, which may be in the form of a key 231, at the other end 150, and the housing 20 has a second lock mechanism 240, which may be a combination rotary lock having a key slot 241 for accepting the key 231, whereby the rotary lock may be positioned to capture the first lock mechanism 230 in the second lock mechanism 240. The lock mechanisms 230,240 are engagably lockable such that the housing 20, and therefore the bicycle, may be secured to a fixed object. Preferably, the cable 130 is manufactured from a hardened steel or other tamper-resistant material.

While the invention has been described with reference to a preferred embodiment, it is to be clearly understood by those skilled in the art that the invention is not limited thereto. Rather, the scope of the invention is to be interpreted only in conjunction with the appended claims.

What is claimed is:

1. A bicycle lock assembly comprising:

a housing having an annular outer wall with a cable access slot and an integral rear wall defining a drum-like compartment, the rear wall supporting a tubular inner wall extending from the rear wall coaxially with the outer wall to define a torus shaped interior space;

a reel providing a tubular core rotatably mounted onto the inner wall, the core supporting a pair of spaced apart guide walls defining a coiling space therebetween;

a flexible cable wound onto the reel between the guide walls, one end of the cable being fixed to the core, the other end of the cable extending through the access slot;

a coil spring having one end fixed to the annular outer wall and the other end fixed to the core of the reel, the spring laying in a spiral form adjacent to one of the guide walls such that rotation of the reel to unreel the cable causes the coil spring to tighten and rotation of the reel to reel-in the cable causes the coil spring to loosen;

a housing cover fixed to an open side of the housing to enclose said housing, the cover having a central hole aligned with an inside diameter of the core so that the housing may be placed onto a bicycle, the inner wall fitting around a tubular member of the bicycle and being captured thereon by a dismountable member of the bicycle;

the cable having a first lock mechanism at the other end, the housing having a second lock mechanism, the first and second lock mechanisms being engagably lockable for securing the bicycle to a fixed object.

2. A bicycle lock assembly comprising:

a housing having an annular outer wall with a cable access slot and an integral rear wall defining a drum-like compartment, the rear wall supporting a tubular inner wall extending from the rear wall coaxially with the outer wall to define a torus shaped interior space;

a reel providing a tubular core rotatably mounted onto the inner wall, the core supporting a pair of spaced apart guide walls defining a coiling space therebetween;

a flexible cable wound onto the reel between the guide walls, one end of the cable being fixed to the core, the other end of the cable extending through the access slot;

a coil spring having one end fixed to the annular outer wall and the other end fixed to the core of the reel, the spring laying in a spiral form adjacent to one of the guide walls such that rotation of the reel to unreel the cable causes the coil spring to tighten and rotation of the reel to reel-in the cable causes the coil spring to loosen;

a housing cover fixed to an open side of the housing to enclose said housing, the cover having a central hole aligned with an inside diameter of the core so that the housing may be placed onto a bicycle, the inner wall fitting around a tubular member of the bicycle and being captured thereon by a bicycle seat;

the cable having a first lock mechanism at the other end, the housing having a second lock mechanism, the first and second lock mechanisms being engagably lockable for securing the bicycle to a fixed object.

3. The bicycle lock assembly of claim 2 wherein the first lock mechanism is in the form of a key.

4. The bicycle lock assembly of claim 3 wherein the second lock mechanism is a combination rotary lock having a key slot for accepting the key therein, whereby the rotary lock may be positioned to capture the first lock mechanism in the second lock mechanism.

* * * * *